March 27, 1945. F. R. HENSEL ET AL 2,372,202
BEARING
Filed May 8, 1940
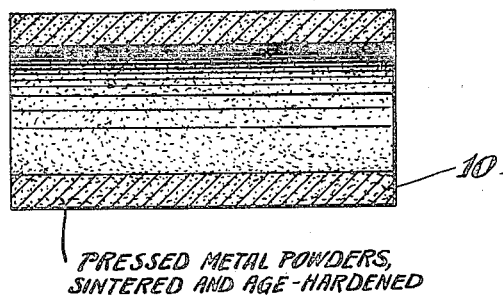
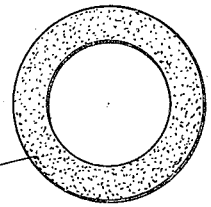
PRESSED METAL POWDERS, SINTERED AND AGE-HARDENED
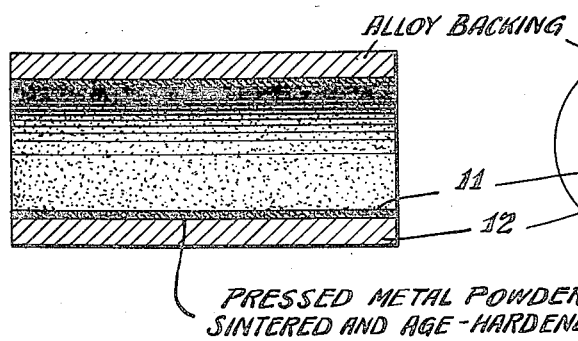
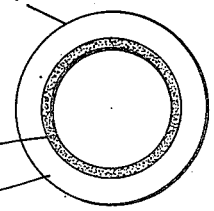
ALLOY BACKING
PRESSED METAL POWDERS, SINTERED AND AGE-HARDENED
INVENTORS
Franz R. Hensel
BY Earl I. Larsen
ATTORNEY Patented Mar. 27, 1945

2,372,202

UNITED STATES PATENT OFFICE 2,372,202

BEARING

Franz R. Hensel and Earl I. Larsen, Indianapolis, Ind., assignors to P. R. Mallory & Co., Inc., Indianapolis, Ind., a corporation of Delaware Application May 8, 1940, Serial No. 333,928

8 Claims. (Cl. 308—242)

This invention relates to bearings and more particularly to bearings made from powdered metals.

An object of the invention is to improve bearings made from powdered metals and particularly to improve their physical properties such as their strength, hardness and wear resistance.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a longitudinal section through a bearing made from pressed metal powders according to one aspect of the present invention;

Figure 2 is an end view of said bearing;

Figure 3 is a section through a bearing of modified construction; and

Figure 4 is an end view of the bearing of Figure 3.

This invention contemplates the manufacture of bearings from metal powders. Such manufacture may involve the steps of pressing metal powders using suitable dies and presses, sintering the compressed bearings thus produced and subsequently applying an age-hardening heat treatment to the bearings, the composition of the bearings being such as to be susceptible to age-hardening. The present invention makes possible the fabrication of bearings of greater strength, hardness and wear resistance than has heretofore been possible while obtaining the economies incident to the use of pressed powders as distinguished from casting of molten metal and the like.

By using pressed powders, for example, it is possible to press the bearing to the desired dimensions and shape in a single operation by using a suitable die and consequently extensive and time-consuming machining and grinding operations are not required or are required only to a very limited extent. While bearings have heretofore been made from pressed metal powders it has not heretofore been practicable to produce pressed powdered bearings of the high strength and hardness which results from the application of the present invention.

The present invention contemplates a bearing having a matrix of copper base metal such as copper and the alpha alloys of copper such as the brasses and bronzes, the aluminum bronzes and the like containing age-hardening ingredients precipitated as a dispersed phase in the cuprous base. The preferred age-hardening ingredients are the intermetallic compounds of the elements nickel, cobalt, iron, manganese and chromium with silicon or phosphorus or, in other words, the silicides or phosphides of these elements. These age-hardening ingredients will readily diffuse into the copper base at elevated temperatures and upon subsequent heat treatment may be precipitated as a dispersed phase in the form of intermetallic compounds which contribute strength, hardness and wear resistance to the copper or alpha alloy of copper. The intermetallic compound-forming elements are added in the proportions in which they are capable of age-hardening the cuprous base and while, in some cases, an excess of these materials may be present without deleterious effect, it is ordinarily only necessary to add from a fraction of a percent to a few per cent of the elements mentioned and of silicon or phosphorus.

The preferred age-hardening ingredients are nickel and silicon which combine to form the intermetallic compound nickel silicide. They are preferably added in a predetermined ratio. It is preferred to have the nickel-silicon ratio between 4:1 and 6:1. The combined nickel and silicon content may preferably range from 1 to 7%.

The balance of the composition may be substantially of copper or the alpha alloys of copper such as the bronzes, brasses, aluminum bronzes and the like.

In the manufacture of bearings of the composition contemplated the powdered elements may be thoroughly mixed in the desired proportions and then pressed into a suitable form using appropriate dies in a hydraulic or automatic press of any well-known type. The dies and presses may be modified in some particulars if desired to facilitate the production of bearings of particular shapes and sizes.

Instead of mixing the elemental powders, it is preferable, where possible, to pre-alloy the ingredients in any known manner as by melting and then to reduce the resulting alloy to a powder, the alloy powder being pressed into the desired shape for forming the bearing.

After the powders have been pressed into the correct shape they are sintered at an elevated temperature. The sintering time will be inversely proportional to the sintering temperature. At a higher temperature a shorter sintering time may be used. Moreover, when pre-alloyed powders are used the sintering time may be somewhat shorter than where the elements are mixed as powders since in the latter case sintering time must be allowed for proper diffusion of the elements into each other. It is preferable in this case to utilize metals which have a high diffusion rate and which are not unduly susceptible to oxidation.

The pre-alloying method has the advantage of requiring less sintering time and there is less danger of undue oxidation of the elements. Thus where the elements are difficult to sinter and especially where than cannot be sintered with entire satisfaction even in an atmosphere of commercial hydrogen the pre-alloying method should be used.

It is sometimes possible, however, to obtain sufficient protection by utilizing a protective flux during the sintering operation. For example, certain hydrides, such as calcium hydride, give off nascent hydrogen which is an extremely powerful reducing agent.

After the pressed metal body has been sintered it is given an age-hardening treatment to effect precipitation of the intermetallic compound or compounds as a dispersed phase in the copper or copper alloy matrix. This age-hardening treatment may preferably comprise quenching the sintered body from a temperature above 700 degrees C. and sebsequently aging the body at an elevated temperature within the range of 350 degrees C. to 700 degrees C. for an extended period of time, such as from one half hour to several hours. The resulting aged body has much higher strength, hardness and wear resistance than a body of similar composition which has not been age-hardened.

It is sometimes desirable to introduce a repressing step after the sintering step to increase the density of the body.

In the making of nickel silicide hardened bearings it is preferred to use from 2 to 4% nickel and from ½% to 1% slicon alloyed with the copper or alpha alloy of copper. The powder is pressed into suitable shape and sintered preferably at a temperature of from 900 to 1000 degrees C. for one-half hour to one hour. The sintering is carried out in a reducing atmosphere such as a hydrogen atmosphere and the body is cooled at a comparatively rapid rate after sintering. A material containing 2.4% nickel, .6% silicon and 97% copper will have a Rockwell F. hardness of approximately 35 after cooling.

By repressing the sintered and cooled body this hardness is increased to 55 Rockwell B. By subsequent aging at 450 degrees C. the hardness is still further increased to 73 Rockwell B. The tensile strength of the aged material exceeds 50,000 pounds per square inch.

The high tensile strength obtained with the bearing of the present invention is highly advantageous in heavy duty applications where extreme pressures and high speeds are encountered. Sintered bearings of the prior art ordinarily have extremely low tensile properties and the tensile strength seldom exceeds 20,000 pounds per square inch. Such bearings are apt to fail due to cracking during heavy duty operation.

The bearings of the present invention have another advantage in having relatively high thermal conductivity. This material reduces the concentration of heat developed at localized bearing areas which has heretofore been one important cause of bearing failure due to the resulting expansion at the heated areas resulting in scoring or freezing of the bearing.

We have attempted to produce bearings of the compositions described herein by casting the metals in the form desired. In this case where a soft lower melting metal is incorporated, as is usually required for bearings, it has been impossible to produce castings which compare favorably with the sintered product herein described. Where lead is used, for example, the cast members were found to be extremely weak and unsound with low tensile strength and having numerous flaws and dirt inclusions. It is also generally recognized that silicon is detrimental to the making of copper-lead alloy bearings by casting. The present invention eliminates these difficulties.

The added intermetallic compound-forming elements such as nickel, for example, also aid in protecting the copper base material from corrosive attack from the acid content in or produced from the lubricating oils present at the bearing surfaces. Nickel materially increases the resistance to attack from such acids.

In the case of nickel silicide hardened materials it is preferred to apply a slow quenching procedure rather than the rapid quenching in water or oil which can be used in some other cases. The preferred procedure for use with sintered nickel silicide-containing bearings is to sinter the bearing at approximately 1000 degrees C. and immediately after sintering to place the bearing in a water cooled chamber where it will cool to room temperature in about ten minutes. We have found that bearings cooled slowly in this manner and subsequently aged have a much higher tensile strength than bearings which are quenched in water and then aged. The slow cooled bearings may have an ultimate tensile strength exceeding 50,000 pounds per square inch whereas the rapidly quenched bearings seldom exceed 20,000 pounds per square inch in tensile strength and often fall as low as 15,000 pounds per square inch.

Where the higher thermal conductivity is desired in the bearing it is preferred to use a copper base substantially free from alloying ingredients which form solid solution with the copper since these tend to decrease the thermal conductivity. It is possible, however, to add elements to copper which do not substantially reduce the thermal conductivity but which add corrosion resistance to the alloy and improve its qualities as a bearing. For example, cadmium added in proportions ranging from .05 to about 5% of the total composition is helpful.

The age-hardened copper alloy forming the matrix of the bearing has an ideal microscopic structure for bearing purposes. The hardened intermetallic compounds are present as microscopic particles distributed throughout the copper base which is itself soft in comparison thereto. The intermetallic compounds being in extremely fine form and embedded in a softer base have no tendency to score the surface of the co-operating bearing.

In some cases it may be desired to add a material having lubricating properties to the powder mixture prior to pressing and sintering. For example, a small amount of graphite may be added to the mixture. It is also possible to add the low melting point metals and alloys such as lead, zinc, cadmium, tin, thallium and babbitt at this stage.

In most cases, however, it is preferred to impregnate the sintered and age-hardened bearing, which ordinarily has a porous structure, with a lubricant after the age-hardening step has been applied. For example, the bearing can be impregnated with one of the lower melting point and softer metals mentioned by immersing the bearing in a bath of the molten soft metal for a sufficient period of time. This impregnation may also in some cases be combined with the age-hardening step by maintaining the bath at the desired temperature for age-hardening purposes and keeping the bearing immersed for a sufficient period of time.

In other cases the porous matrix may be impregnated with an organic lubricant such as lubricating oils and greases and other lubricating compounds.

The porosity may be regulated by controlling the pressure at which the powders are originally pressed by applying in some cases a repressing operation after sintering to obtain a predetermined density of the material.

Referring to the drawing, Figures 1 and 2 illustrate a cylindrical bearing 10 made from pressed copper powders containing age-hardening ingredients, the bearing being sintered and age-hardened as described herein. Figures 3 and 4 illustrate a modified form of bearing wherein the bearing surface 11 is formed of the pressed, sintered and age-hardened metal powders, the powders being pressed against a backing support 12 of a strong alloy such as iron or steel or the like.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. A bearing formed of a matrix of sinter-bonded metallic particles forming a coherent pressure resisting structure, said matrix having a base of cuprous metal selected from the group consisting of copper, brass, and bronze and a precipitation hardening ingredient present as a dispersed phase therein, whereby said base is hardened and strengthened.

2. A bearing formed of a matrix of sinter-bonded metallic particles forming a coherent pressure resisting structure, said matrix having a base of cuprous metal selected from the group consisting of copper, brass, and bronze and a precipitation hardening ingredient present as a dispersed phase therein, whereby said base is hardened and strengthened, said precipitation hardening ingredient being an intermetallic compound selected from the group consisting of the silicides and phosphides of the elements nickel, cobalt, iron, manganese and chromium.

3. A bearing formed of a matrix of sinter-bonded metallic particles forming a coherent pressure resisting structure, said matrix having a base of cuprous metal selected from the group consisting of copper, brass, and bronze and a precipitation hardening ingredient present as a dispersed phase therein, whereby said base is hardened and strengthened, said precipitation hardening ingredient being a silicide of a metal selected from the group consisting of nickel, cobalt and iron.

4. A bearing formed of a porous matrix of sinterbonded metallic particles forming a coherent pressure resisting structure, said matrix having a base of cuprous metal selected from the group consisting of copper, brass and bronze and a precipitation hardening ingredient present as a dispersed phase therein, and a lubricant in the pores of said matrix.

5. A bearing formed of a porous matrix of sinter-bonded metallic particles forming a coherent pressure resisting structure, said matrix having a base of cuprous metal selected from the group consisting of copper, brass and bronze and a precipitation hardening ingredient present as a dispersed phase therein, and a lubricant in the pores of said matrix, said lubricant being a lubricating metal of lower melting point and softer than copper.

6. A bearing formed of a porous matrix of sinter-bonded metal particles forming a coherent pressure resisting structure, said matrix having a base of cuprous metal selected from the group consisting of copper, brass and bronze and a precipitation hardening ingredient of nickel silicide present as a dispersed phase therein, and a lubricating metal in the pores of said matrix.

7. A bearing formed of a porous matrix of sinter-bonded metal particles forming a coherent pressure resisting structure, said matrix being composed of cuprous metal selected from the group consisting of copper, brass, and bronze, and a precipitation hardening ingredient of nickel silicide present as a dispersed phase therein, the ratio of nickel to silicon in said matrix being between 4:1 and 6:1 and the combined nickel and silicon content amounting to 1 to 7% of said matrix, and a lubricating metal in the pores of said mtarix.

8. A bearing formed of a porous matrix of sinter-bonded metal particles forming a coherent pressure resisting structure, sahid matrix being composed of cuprous metal selected from the group consisting of coper, brass and bronze, and a precipitation hardening ingredient of nickel silicide present as a dispersed phase therein, the ratio of nickel to silicon in said matrix being between 4:1 and 6:1, and the combined nickel and silicon content amounting to 1 to 7% of said matrix, and lead in the pores of said matrix.

FRANZ R. HENSEL.
EARL I. LARSEN.